(12) United States Patent
Walpurgis

(10) Patent No.: US 11,401,018 B2
(45) Date of Patent: Aug. 2, 2022

(54) SWIMMING AND DIVING AID HAVING A CAMERA

(71) Applicant: CAYAGO TEC GMBH, Bad Salzuflen (DE)

(72) Inventor: Hans-Peter Walpurgis, Kitzbühel (AT)

(73) Assignee: Cayago Tec GmbH

( * ) Notice: Subject to any disclaimer, the term of this patent is extended or adjusted under 35 U.S.C. 154(b) by 282 days.

(21) Appl. No.: 16/478,645

(22) PCT Filed: Jan. 4, 2018

(86) PCT No.: PCT/EP2018/050213
§ 371 (c)(1),
(2) Date: Jul. 17, 2019

(87) PCT Pub. No.: WO2018/134060
PCT Pub. Date: Jul. 26, 2018

(65) Prior Publication Data
US 2021/0129959 A1  May 6, 2021

(30) Foreign Application Priority Data
Jan. 20, 2017 (DE) .................... 10 2017 101 146.3

(51) Int. Cl.
*B63C 11/46* (2006.01)
*A63B 35/12* (2006.01)
*G03B 17/08* (2021.01)

(52) U.S. Cl.
CPC .............. *B63C 11/46* (2013.01); *A63B 35/12* (2013.01); *G03B 17/08* (2013.01); *A63B 2220/806* (2013.01)

(58) Field of Classification Search
CPC ... B63C 11/46; A63B 35/12; A63B 2220/806; A63B 71/0622; G03B 17/08
See application file for complete search history.

(56) References Cited

U.S. PATENT DOCUMENTS

| 2,918,889 A | 12/1959 | Rebikoff |
| 4,864,959 A | 9/1989 | Takamizawa et al. |

(Continued)

FOREIGN PATENT DOCUMENTS

| CN | 1413877 A | 4/2003 |
| CN | 2690289 Y | 4/2005 |

(Continued)

OTHER PUBLICATIONS https://shop.sublue.fr/en/underwater-scooter/88-sublue-navbow (Year: 2019).*

(Continued)

*Primary Examiner* — Howard D Brown, Jr.
(74) *Attorney, Agent, or Firm* — Lucian Wayne Beavers; Gary L. Montle; Patterson Intellectual Property Law, PC

(57) ABSTRACT

The invention relates to a swimming and diving aid, having a hull which comprises a flow channel or with which a flow channel is associated, a motor-driven water acceleration arrangement, in particular a propeller, being associated with the flow channel; having a support surface for an upper body on an upper side of the hull; having grips mounted on the swimming and diving aid, control elements for controlling the water acceleration arrangement by means of an associated motor controller being provided on the grips; and having a display, facing toward the support surface, for showing operating parameters of the swimming and diving aid. Provision can be made in this context that a forward-directed front camera is integrated into the hull in front of the support surface in a direction of travel, and is connected to an electronic control system; that the electronic control system is embodied to apply control to the front camera and to receive camera signals; and that a switching element for starting and ending a video capture is arranged on at least one grip. The invention makes possible the acquisition of (Continued)

video captures in the travel direction of the swimming and diving aid.

20 Claims, 8 Drawing Sheets

(56) References Cited

U.S. PATENT DOCUMENTS

| | | | | |
|---|---|---|---|---|
| 5,105,753 | A * | 4/1992 | Chih | A63B 35/12 |
| | | | | 440/6 |
| 5,158,034 | A * | 10/1992 | Hsu | A63B 35/12 |
| | | | | 440/6 |
| 5,399,111 | A * | 3/1995 | Kobayashi | B63B 34/10 |
| | | | | 114/55.58 |
| 5,634,423 | A * | 6/1997 | Lashman | B63C 11/46 |
| | | | | 440/6 |
| 6,115,060 | A | 9/2000 | Rowley | |
| 6,848,385 | B2 | 2/2005 | Mah | |
| 7,963,814 | B2 | 6/2011 | Grimmeisen | |
| 8,651,041 | B2 * | 2/2014 | Myers | B63C 11/46 |
| | | | | D12/308 |
| 9,725,144 | B2 | 8/2017 | Noras | |
| 9,729,253 | B2 | 8/2017 | Tobias et al. | |
| 10,603,550 | B1 * | 3/2020 | Fultz | B63C 11/46 |
| D887,947 | S * | 6/2020 | Ma | D12/308 |
| D897,267 | S * | 9/2020 | Wei | D12/308 |
| 2004/0079272 | A1 * | 4/2004 | Mah | B63C 11/46 |
| | | | | 114/315 |
| 2005/0279271 | A1 * | 12/2005 | Mah | B63C 11/46 |
| | | | | 114/315 |
| 2013/0008366 | A1 * | 1/2013 | Montousse | B63C 11/46 |
| | | | | 114/313 |
| 2014/0190389 | A1 * | 7/2014 | Montousse | B63C 11/46 |
| | | | | 114/315 |
| 2014/0193206 | A1 * | 7/2014 | Montousse | B63G 8/001 |
| | | | | 405/185 |
| 2015/0210368 | A1 | 7/2015 | Lee | |
| 2016/0119065 | A1 | 4/2016 | Tobias et al. | |
| 2021/0129959 | A1 * | 5/2021 | Walpurgis | B63C 11/46 |
| 2022/0055727 | A1 * | 2/2022 | Robinson | B63C 11/46 |

FOREIGN PATENT DOCUMENTS

| | | |
|---|---|---|
| CN | 1955069 A | 5/2007 |
| CN | 201878251 U | 6/2011 |
| CN | 104960639 A | 10/2015 |
| DE | 102004049615 A1 | 4/2006 |
| DE | 102015100497 A1 | 7/2016 |
| WO | 2012089951 A1 | 7/2012 |
| WO | 2015034382 A1 | 3/2015 |
| WO | 2016065294 A1 | 4/2016 |

OTHER PUBLICATIONS

International Search Report from corresponding PCT/EP2018/050213, dated May 4, 2018, 12 pp.
Japan Office Action for corresponding patent application No. 2019-539997, dated Sep. 7, 2021, 6 pages.
Translation of Japan Office Action for corresponding patent application No. 2019-539997 that was dated Sep. 7, 2021, 5 pages.
German Office Action of corresponding patent application No. 102017101146.3, dated Sep. 17, 2019, 10 pages.
China Search Report of corresponding patent application No. 2018800072400, dated Aug. 7, 2020, 3 pages.
China Office Action of corresponding patent application No. 2018800072400, dated Aug. 14, 2020, 6 pages.
China Office Action of corresponding patent application No. 2018800072400, dated Feb. 9, 2021, 5 pages.

* cited by examiner

SWIMMING AND DIVING AID HAVING A CAMERA

The invention relates to a swimming and diving aid, having a hull which comprises a flow channel or with which a flow channel is associated, a motor-driven water acceleration arrangement, in particular a propeller, being associated with the flow channel; having a support surface for an upper body on an upper side of the hull; having grips mounted on the swimming and diving aid, control elements for controlling the water acceleration arrangement by means of an associated motor controller being provided on the grips; and having a display, facing toward the support surface, for showing operating parameters of the swimming and diving aid.

A water vehicle of this kind, used in particular recreationally as a "water scooter," is known from DE 10 2004 049 615 A1. It comprises a grip arrangement that a user can grasp while he or she rests, with a portion of his or her upper body, on top of the hull of the water vehicle. A flow channel, in which a propeller is accommodated, is arranged inside the hull. The propeller is driven by an electric motor that is supplied with electricity via a rechargeable battery.

With the known water vehicle, precise weight taring is necessary in order to permit operation both underwater and on the water. The water vehicle should therefore produce enough buoyancy that it is sufficiently capable of floating and consequently cannot sink. The buoyancy should nevertheless not be excessive, so that a rapid changeover from water-surface operation to diving operation is possible. Because of the dead weight of the internal electrical fittings, the water vehicle must comprise in the hull a buoyancy body of sufficient size, which influences the overall size and thus the operating dynamics of the water vehicle. Flooding chambers, which fill up with water and ensure optimum weight taring during operation, can furthermore be provided inside the hull. For transportation out of the water, the flooding chambers are drained so that the water vehicle's own weight is low.

The arrangement of the various components of the water vehicle is selected so that both with and without a user on top, the water vehicle rests in the water in stable fashion with its upper side upward. The mass distribution is such that the water vehicle sits in the water upright and without listing. The mass is preferably distributed between the starboard side and port side of the water vehicle symmetrically with respect to a symmetry surface proceeding from the bow to the stern of the water vehicle.

The water vehicle has an external shape that ensures low flow resistance, in order to minimize the energy consumption of the water vehicle. The weight of the water vehicle is designed to be such that it can be carried.

The document U.S. Pat. No. 6,115,060 discloses a holding system having a receiving sleeve for a video camera. The receiving sleeve is closed off, in a viewing direction of the camera, by a transparent covering or by an optical element. An aperture, on which a fitting is secured, is introduced into a boat hull. The fitting has for that purpose a sleeve having an external thread and having an end-located encircling flange. It is inserted through the aperture in the boat hull so that the encircling flange abuts from outside against the hull. From the inner side of the hull, a flange element having an internal thread is threaded onto the external thread of the sleeve so that the rim of the aperture is clamped sealedly between the external flange and the internally abutting flange. The receiving sleeve having the camera is inserted into the sleeve of the fitting and sealed encirclingly with O-rings. A covering cap, which axially secures the receiving sleeve, is threaded at the end onto the external thread of the sleeve.

Disadvantageously, when the video camera is fastened onto a boat hull in the manner shown in U.S. Pat. No. 6,115,060, the camera can be oriented only in the direction of the surface normal line of the boat hull in the region of the aperture that is provided. To enable a different direction of view, additional optical elements such as prisms are necessary, or the camera must be arranged movably in the receiving sleeve, for example by way of a complexly rotatably mounted housing. Because no surface regions of the hull which are oriented in a travel direction are usually present especially in the region of the bow of water vehicles, forward-looking video image acquisition is possible only by using such cost-intensive optical elements or movable housing components. To enable video imaging without blurring, it is furthermore necessary for the boat hull to exhibit, in the region of the passthrough, sufficient flexural rigidity to prevent vibrations. This is not guaranteed in particular for water vehicles that are embodied to be portable, having thin hull wall thicknesses and a high level of propulsion power. A further disadvantage results from the fact that the hull must be embodied to be flat in the region of the aperture in order to enable watertight installation of the holding system by means of the flange and the bolted-on flange element. In water vehicles that are optimized in terms of fluid dynamics and are also designed for diving operation, such flat surface regions are not present especially in the region of the bow of the water vehicle, so that front-end mounting of the video camera is not possible.

WO 2015/034382 A1 discloses a self-propelled water vehicle, in particular for maritime rescue. The water vehicle is designed in a U-shape, an electrically driven propulsion turbine being arranged in each limb that is embodied as a float. The turbines are mounted pivotably. As a result, the water vehicle can rest on the water with its two surfaces in any manner, such that the turbines pivot toward water entrance openings facing toward the water, draw in water from there, and eject it again at the end of the limb. Grips that a person can grasp are arranged laterally on the limbs. The water vehicle can be controlled via a remote control system. Cameras (not described in further detail), which send signals to a central controller, can be associated with the water vehicle.

WO 2012/089951 describes a diving aid having a (digital) camera fastened to the diving aid via a pivotable frame. The camera is directed toward the bottom of the body of water, and serves to image the habitat there. Lasers are installed on the frame in order to determine the distance to the bottom. Also described is a triggering unit that enables automatic photographing at a predetermined time or at regular time intervals. The frame having the installed camera considerably increases the flow resistance of the diving aid, and it is suitable only for slow underwater travel.

The object of the invention is to furnish a swimming and diving aid of the kind mentioned initially which makes possible, in a context of low flow resistance for the swimming and diving aid and simple operation, the capture of video images in a direction of travel.

The object of the invention is achieved in that a forward-directed front camera is integrated into the hull in front of the support surface in a direction of travel, and is connected to an electronic control system; that the electronic control system is embodied to apply control to the front camera and to receive camera signals; and that a switching element for starting and ending a video capture is arranged on at least one grip. The front camera makes possible the creation of video captures in a travel direction of the swimming and diving aid. It is oriented in the gaze direction of an operator of the swimming and diving aid, so that it advantageously captures the image portions toward which an operator is facing with the swimming and diving aid. The orientation of the front camera in a travel direction and in front of the operator support surface is made possible by integrating the front camera into the hull of the swimming and diving aid. Integration is accomplished in such a way that the external shape of the hull in the region of the front camera is at least very largely retained. The front camera can be arranged in hull regions having small outer hull contour radii, such as those predominantly present in the fluid-dynamically optimized bow region of the swimming and diving aid. No camera parts or holders for the front camera are arranged outside the hull. The flow resistance of the swimming and diving aid is thus not impaired by the front camera. The switching element mounted on the grip, for starting and ending video captures, makes possible simple, reliable, and intuitive operation of the front camera even during vigorous riding.

Images (selfies) of the operator of the swimming and diving aid (which is used principally in the recreational sector) can be enabled by the fact that a rearward-directed back camera is arranged in front of the support surface and is connected to the electronic control system. Advantageously, control application to the back camera, and acquisition of the video signals transmitted by the back camera, are accomplished by the same electronic control system to which the front camera is also connected. This makes possible a simple and cost-effective design for the video system constructed with two differently oriented cameras.

Simple and easily operated selection of the camera that is to be activated can be made possible by the fact that a switchover element, for switching over between the two cameras with which video capture is respectively occurring, is arranged on at least one grip. The switchover element, like the switching element, is arranged on a grip of the swimming and diving aid and is thus easy for an operator to reach. Advantageously, the switching element is mounted on one grip, and the switchover element on the other grip, of the swimming and diving aid.

In order to enable monitoring of the video capture currently being acquired, provision can be made that the display is connected to the electronic control system of the cameras and is designed to show the image being acquired using the respectively selected camera. Advantageously, the electronic control system and the display also make possible playback of video sequences that have already been captured, so that, for example, they can be evaluated and deleted in order to free up memory space for further video captures.

If provision is made that an LCD display element of the display, the back camera, and the electronic control system are arranged in a one- or two-part housing embodied to be watertight, the components can then be arranged in correctly oriented and vibration-proof fashion. With a two-part configuration, the housing parts preferably can be joined in watertight fashion to one another. As a result of the watertight configuration, neither water from outside nor water from a flooding chamber of the swimming and diving aid penetrates into the housing or housings. Integration of the components into a one- or two-part housing makes possible short and therefore low-interference electric connections to the components.

The fact that the housing that is embodied to be watertight is covered by a transparent display covering at least in the region of the LCD display element, or in the region of the LCD display element and of the back camera, makes it possible to show video captures and capture videos with the back camera. The display covering offers mechanical protection for the LCD display element and the back camera, and furthermore prevents water from penetrating into the housing.

According to a preferred variant embodiment of the invention, provision can be made that the electronic control system is connected to the motor controller via a data bus; that the switching signals of the switching element and/or of the switchover element are delivered to the motor controller; and that the electronic control system is embodied to retrieve the switching signals of the switching element and/or of the switchover element from the motor controller. Dual functions can thus be assigned to the switchover element and the switching element by the fact that they are used, depending on a respective menu selection, for example to set operating parameters for controlling the propulsion motor or for controlling video captures. Excellent fail-safe performance is achieved because even in the event of failure of the electronic control system of the video system, it is still possible to apply control to the motor controller via the switching element or the switchover element.

In order to avoid inadvertent starting of a video capture, for example when the swimming and diving aid is being transported or stored out of the water, provision can be made that the control unit is embodied to enable a video capture if a voltage is applied to an electric motor of the water acceleration arrangement, and not to enable a video capture if no voltage is applied to the electric motor of the water acceleration arrangement. The power level set on the motor controller, for example, can be retrieved in order to determine whether a voltage is being applied to the electric motor.

Advantageously, the swimming and diving aid comprises an apparatus with which propulsion of the swimming and diving aid is avoided even when the electric motor is running. This can be accomplished, for example, by way of a mechanical decoupling of the electric motor from the propeller.

In order to prevent video captures from being shortened due to memory-space problems, provision can be made that the control unit is embodied to enable a video capture when a free memory capacity of a memory for the video captures corresponds to or exceeds a predefined limit value, and not to enable a video capture if the free memory capacity of the memory for the video captures falls below the predefined limit value; and/or that the control unit is embodied to interrupt a video capture if the free memory capacity of the memory for the video captures falls below a predefined second limit value. The two limit values can be selected to be identical. Advantageously, provision can be made that the limit value corresponds to a greater memory capacity than does the second limit value. Initiation of a video capture is enabled only when the memory capacity makes possible a sufficiently long capture time. An ongoing video capture can be terminated if the memory capacity has reached a lower limit necessary for operation of the video system.

A preferred variant embodiment of the invention provides that the control unit comprises a radio interface, in particular a WiFi interface or WLAN interface and/or a Bluetooth interface; and that the control unit is embodied to transfer video data and/or to receive software updates for all hardware components of the swimming and diving aid, for example for the camera control system and/or for the display control system and/or for the motor controller and/or for the rechargeable-battery management system (rechargeable battery controller), via the radio interface. Video data can thereby be transferred in simple fashion to an external memory, for example to a smartphone, a laptop, or a personal computer. The software of the video system can be adapted to new developments. An additional functionality of the swimming and diving aid is enabled thanks to the transfer of software updates for the motor controller. For example, operating properties of the swimming and diving aid can be adapted or individually adjusted to an operator's preference, or newly developed software sequences for the motor controller can be transferred.

To allow audio captures as well, provision can be made that a microphone is associated with the front camera and/or back camera; and that the captured audio signals are delivered to the control unit. The audio signals are thus recorded together with the video signals of the particular camera that is active. Cost-effectively, a microphone is associated with only one camera and can capture audio signals, for example, regardless of which of the cameras is currently active.

Error-free data transfer from the front camera to the electronic control system can be ensured by the fact that the front camera is connected to the control unit via a digital interface, in particular a USB interface, and a data cable.

In order to enable error-free data transfer from the back camera to the control unit, provision can be made that the back camera is connected to the control unit via a digital interface, in particular a MIPI interface.

Simple and secure fastening of the front camera with a viewing angle directed forward with reference to the travel direction of the swimming and diving aid can be enabled by the fact that the front camera is arranged in a watertight camera enclosure; that the watertight camera enclosure is received in a front camera receptacle inside the hull and fastened to the hull of the swimming and diving aid; that the outer envelope of the hull comprises, in the viewing direction of the front camera, a camera passthrough in which a transparent window is arranged; and that the transparent window closes off the watertight camera enclosure at the front.

Particularly preferably, provision can be made that the front camera receptacle is in physical communication with a flooding chamber of the swimming and diving aid. The flooding chamber of the swimming and diving aid is in communication with the surrounding water via water inlet openings and water outlet openings. Water floods through said chamber during operation of the swimming and diving aid, thereby exactly adjusting the buoyancy of the swimming and diving aid. Electrical components of the swimming and diving aid, for example the electric motor, requisite rechargeable batteries, or the motor controller, can be arranged in the flooding chamber, each correspondingly sealed. Waste heat from the electrical components is thereby effectively dissipated. On land, water flows out of the flooding chamber through the water inlet openings and water outlet openings, so that the weight of the swimming and diving aid is appreciably reduced. Thanks to the watertight embodiment of the camera enclosure, it can be arranged in the front camera receptacle that is connected to the flooding chamber, and can be surrounded by water during swimming and diving operation. Separate sealing of the front camera receptacle, both externally and internally with respect to the flooding chamber, is thus not necessary. This makes possible a simple configuration for the hull of the swimming and diving aid.

Advantageously, provision can be made that the transparent window, or a window housing in which the transparent window is held, is sealed with respect to the camera passthrough; or that a water-conveying gap is configured between the transparent window, or the window housing in which the transparent window is held, and the camera passthrough. A seal prevents water from flowing into the hull in the region of the camera passthrough. The transparent window or the window housing can furthermore be fixedly connected to the hull by way of the seal, and enhanced stability for the camera holder can thereby be achieved. If the transparent window or the window housing is connected in non-watertight fashion to the camera passthrough, the result is a configuration that is easy to install. An arrangement of this kind is useful in particular when the front camera is enclosed in a watertight camera enclosure, and when the front camera receptacle, in which the camera enclosure is arranged, is connected to a flooding chamber of the swimming and diving aid. The water flowing into the hull between the transparent window, or the window housing, and the rim of the camera passthrough thus travels into the flooding chamber that is in any case filled with water. Advantageously, a transparent window installed in non-sealed fashion, or a transparent window housing installed in non-sealed fashion, can easily be removed or replaced in a service situation.

Simple alignment of the transparent window or the window housing in a circumferential direction with respect to the hull can be achieved by the fact that the transparent window, and/or a window bezel of the window housing in which the transparent window is held, is of oval configuration.

Exact alignment of the window housing with respect to the camera enclosure, in both a circumferential direction and an axial direction, can be achieved by the fact that the window housing is connected sealedly to the camera enclosure; and that the window housing and the camera enclosure comprise locking means that define, in both an axial and a circumferential direction, an unequivocal orientation of the window housing with respect to the camera enclosure. If the orientation of the window housing in a circumferential direction with respect to the hull is additionally predefined, for example by way of the oval configuration of the transparent window or of the window bezel, exact alignment of the front camera arranged in the camera enclosure, with respect to the hull of the swimming and diving aid, can be achieved.

A cable-based connection between the front camera and the electronic control system can be achieved by the fact that the camera enclosure is closed off at the rear by a housing closure that can be placed in watertight fashion onto the camera enclosure; and that a data cable for transferring video data to the control unit is guided in watertight fashion through the housing closure.

In accordance with a particularly preferred variant embodiment of the invention, provision can be made that the hull is embodied in stiffened fashion in the region of the front camera receptacle. Vibrations of the hull, and thus of the front camera, in the region of the front camera receptacle can thereby be avoided.

The invention will be explained in further detail below with reference to an exemplifying embodiment depicted in the drawings, in which:

FIG. 1 is a perspective side view from behind of a swimming and diving aid 10. FIG. 2 is a perspective side view from the front of the swimming and diving aid 10 shown in FIG. 1.

Figure 1:
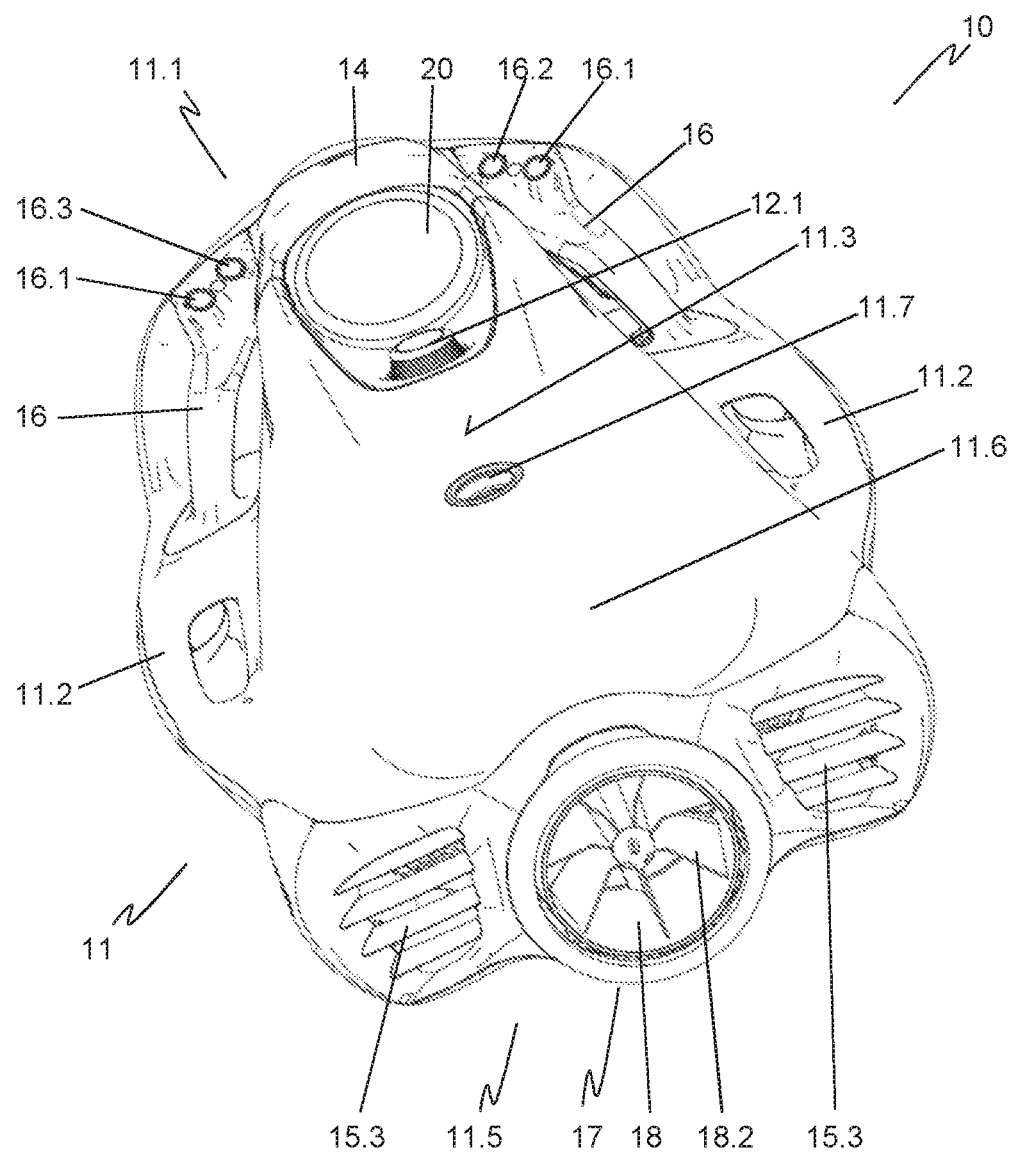
FIG. 1 is a perspective view from behind of a swimming and diving aid.

Swimming and diving aid 10 comprises a hull 11. Hull 11 is made up of an upper part 11.6 and a lower part 11.4 (shown in FIG. 2). Upper part 11.6 is equipped with two grips 16 that are arranged on either side of hull 11. A user can grasp these grips 16 and control swimming and diving aid 10 using control elements 16.1 mounted on grips 16. In particular, the motor power level of swimming and diving aid 10 can be varied here. In addition, a switching element 16.2 is arranged on one of grips 16, and a switchover element 16.3 on the opposite grip 16. The user who is grasping grips 16 lies with his or her upper body on a support surface 11.3 in the region behind a display 20 on upper part 11.6. In this position, the user can easily read display 20 and operate control elements 16.1, switching element 16.2, and switchover element 16.3. Mounted on support surface 11.3 is a holder 11.7 for fastening a belt system with which the user can be belted onto swimming and diving aid 10. Arranged in front of support surface 11.3 is a closure 12.1 for a charging socket 12 located therebehind and shown in FIG. 4. Rechargeable batteries contained in hull 11 can be charged via charging socket 12.

Carrying handles 11.2, with which swimming and diving aid 10 can be carried when not in the water, are arranged laterally on hull 11.

Figure 2:
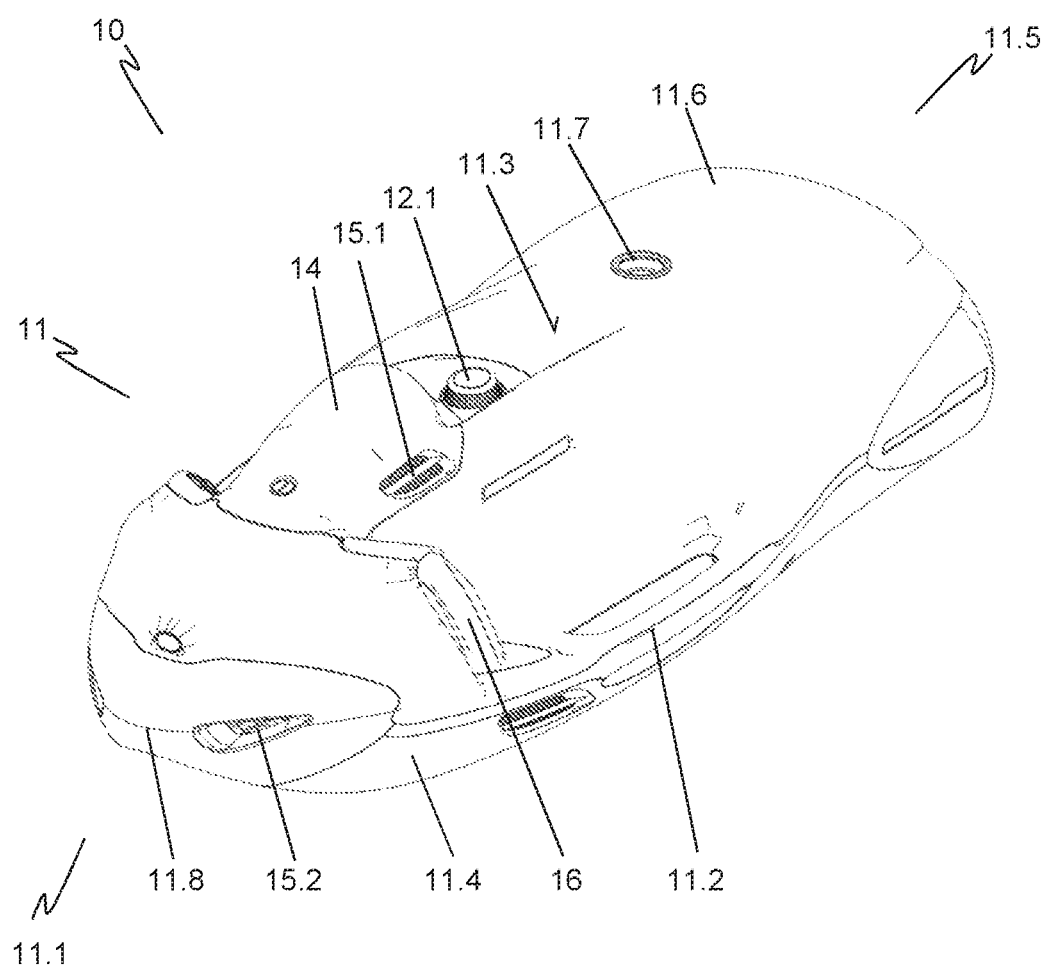
FIG. 2 is a perspective view from the front of the swimming and diving aid shown in FIG. 1.

A removable covering hood 14 is fastened onto hull 11, in front of display 20 in a travel direction and between the two grips 16. As shown in FIG. 2, vent openings 15.1 are provided laterally in covering hood 15 and are connected to a flooding chamber 19 that is provided in hull 11 and shown in FIG. 4.

As is evident from FIG. 2, water inlet openings 15.2, through which water can flow into flooding chamber 19, are provided in the region of bow 11.1. Flooding chamber 19 can be vented for that purpose through vent openings 15.1 of covering hood 14. The buoyancy of swimming and diving aid 10 is adjusted by way of flooding chamber 19 that is filled with water, in order to retain a predefined buoyancy force so that both swimming and diving operation are possible. Water outlet openings 15.3, which are covered by vanes and are also in communication with flooding chamber 19, are mounted at stern 11.5 (shown in FIG. 1) of swimming and diving aid 10. As soon as swimming and diving aid 10 is placed into the water, flooding chamber 19 becomes flooded with water that penetrates through water inlet openings 15.2 and water outlet openings 15.3. As soon as swimming and diving aid 10 transitions to moving operation, a flow is generated in flooding chamber 19, such that water enters flooding chamber 19 through water inlet openings 15.2. Water flows through flooding chamber 19 and flows around electrical components contained in flooding chamber 19, for example an electric motor 30 (shown in FIG. 4) for propelling swimming and diving aid 10, or the associated rechargeable batteries. In that context, the water absorbs the waste heat of the electrical components and cools them. After flowing through flooding chamber 19, the water leaves it through water outlet openings 15.3, which are arranged symmetrically on either side of a jet outlet 17 of a flow channel 18. Arranged in flow channel 18 is a propeller (not shown) of swimming and diving aid 10, which draws in water and ejects it from jet outlet 17, thereby propelling swimming and diving aid 10.

A flow stator 18.2, which counteracts a rotation of the water flowing through flow channel 18, is arranged at the end in flow channel 18, so that water flows out of flow channel 18 with as little rotation as possible, the rotational energy of the water being converted into a linear motion energy and thus serving to propel swimming and diving aid 10.

Hull 11 of swimming and diving aid 10 is manufactured from a plastic or a composite material. The result is that the weight of swimming and diving aid 10 is low, so that when not in the water it can be carried by a single person. A bow tip 11.8 constituting the front region of bow 11.1 is produced from an elastic material, for example rubber or silicone, thereby increasing the impact resistance of swimming and diving aid 10 in the region of bow 11.1. Above bow tip 11.8, a transparent window 61 of a front camera subassembly 60 (shown in further detail in FIGS. 5 and 6) is recessed into hull 11 of swimming and diving aid 10. Transparent window 61 is fastened onto hull 11 centeredly and facing in a direction of travel.

Figure 3:
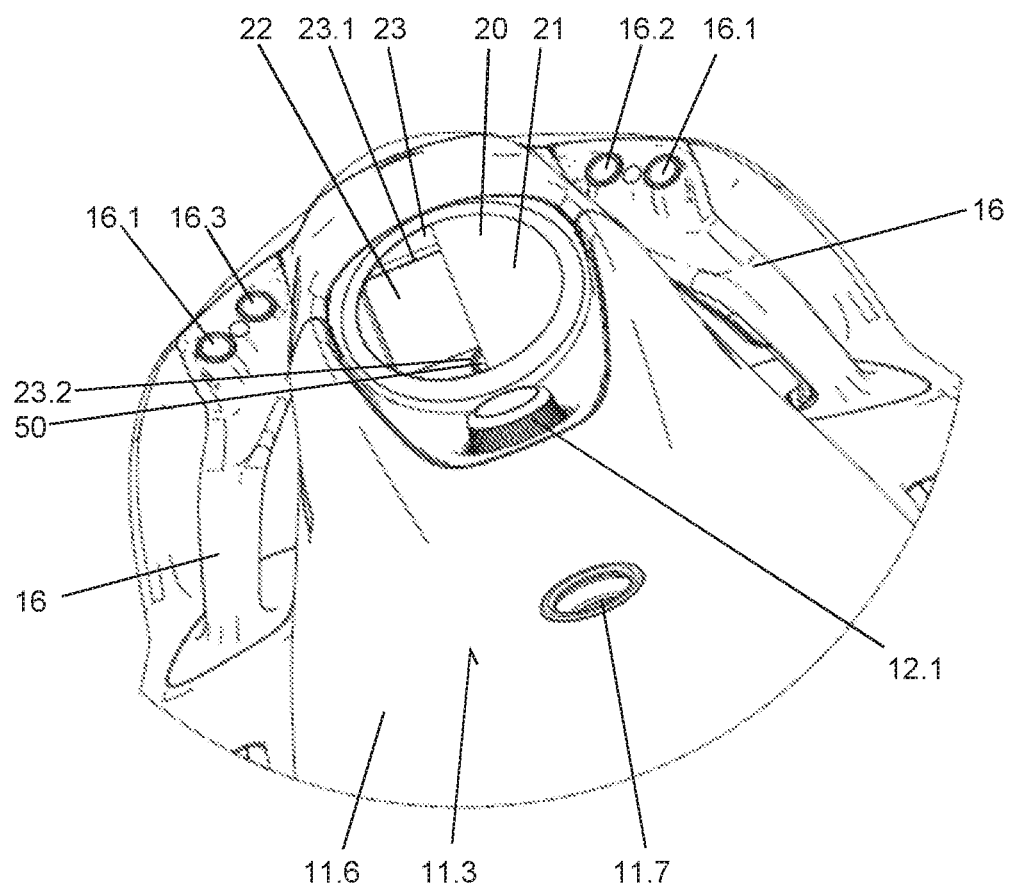
FIG. 3 is a perspective side view from behind of a portion, in the region of a display, of the swimming and diving aid shown in FIG. 1.

FIG. 3 is a perspective side view from behind of a portion of swimming and diving aid 10, shown in FIG. 1, in the region of display 20. Display 20 serves, inter alia, to show operating parameters of swimming and diving aid 10, for example the current power setting of a propulsion unit as set by the operator via control elements 16.1, a traveling speed, or a diving depth. A transparent display covering 21 is depicted as partly open. Transparent display covering 21 is produced in the present case from clear acrylic. An LCD display element 22 is arranged behind transparent display covering 21. LCD display element 22 is inserted into an LCD display element receptacle 23.1 of a display housing 23. A back camera 50 is arranged below LCD display element 22. Back camera 50 is held in a back camera receptacle 23.2 of display housing 23. Back camera 50 looks through transparent display covering 21 toward support surface 11.3. During operation, it images in particular the face of an operator of swimming and diving aid 10 who is lying on support surface 11.3.

Figure 4:
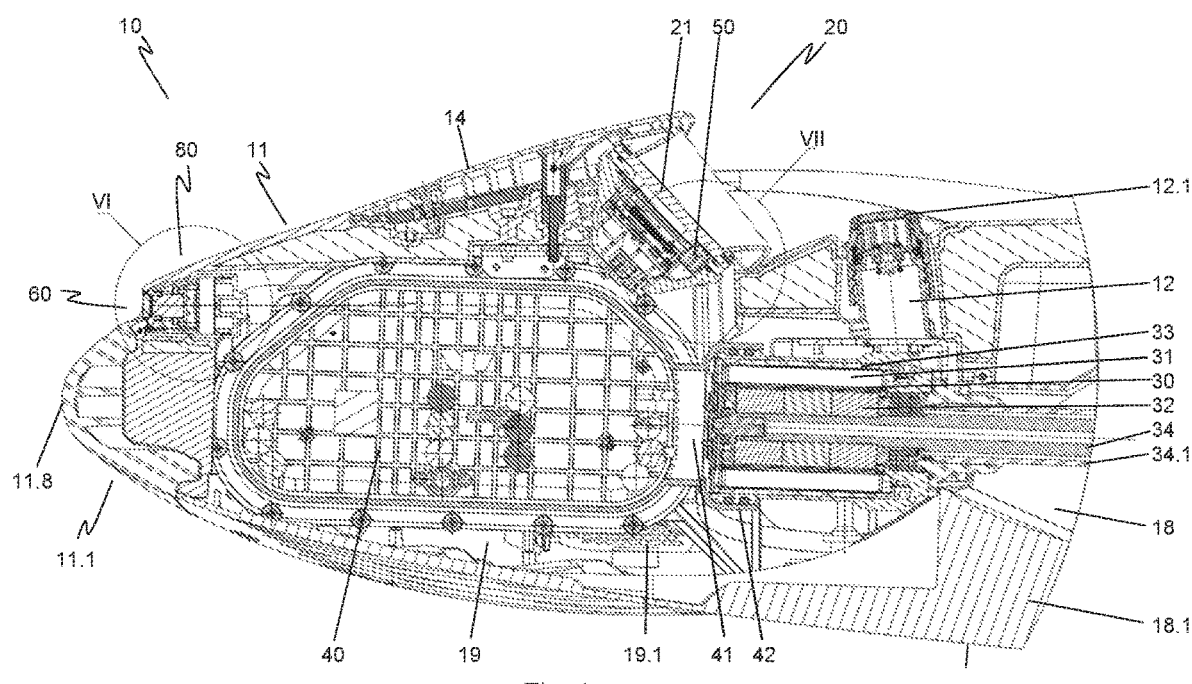
FIG. 4 is a section view from the side of a front region of the swimming and diving aid shown in FIG. 1.

FIG. 4 is a lateral section view of a front region of swimming and diving aid 10 shown in FIG. 1. Identical reference characters are used for identical components.

An underwater propulsion unit is arranged inside hull 11. In the present exemplifying embodiment, the underwater propulsion unit has associated with it: an electric motor 30; an electronics housing 40; a motor shaft 34, manufactured in the present case from carbon fiber-reinforced plastic and having a surrounding external tube 34.1; and a propeller (not shown).

A motor controller (not shown) is arranged in electronics housing 40 and enclosed in watertight fashion by electronics housing 40. Electronics housing 40 is constituted by two housing halves and can be opened by removing one housing half. Only one housing half is depicted in the section view that was chosen. A second housing half (not depicted) rests in watertight fashion, with an encircling second closure surface, on a closure surface of the first housing half. A seal (not depicted) is provided for that purpose between the two closure surfaces. Electronics housing 40 is mechanically connected via an opening portion 41 to electric motor 30. A sealing portion 41.1, adjoining opening portion 41, is placed for that purpose onto the end of a motor housing 33 of electric motor 30. The gap formed between sealing portion 41.1 and motor housing 33 is sealed by means of sealing elements 42. Electronics housing 40 is thereby connected in watertight fashion to motor housing 33 of electric motor 30. Electrical connections between the motor controller and electric motor 30 can be routed through opening portion 41.

Electronics housing 40 is held in flooding chamber 19 with the aid of fastening elements. Flooding chamber 19 comprises flooding openings 19.1 through which water can flow into flooding chamber 19. Electric motor 30 is also arranged inside flooding chamber 19. Electric motor 30 is fastened to hull 11.

Motor shaft 50 is guided within external tube 34.1 from electric motor 30 into flow channel 18 of swimming and diving aid 10. Flow channel 18 extends from an inflow opening 18.4 on the underside of swimming and diving aid 10 to jet outlet 17 at its stern 11.5, as shown in FIG. 2. It can be configured in one piece in hull 11. In the present exemplifying embodiment, flow channel 18 is constituted by an upper shell and a lower shell that are connected to one another by means of suitable fastening means. A directing element 18.1, past which water flows and which forms a lower support of swimming and diving aid 10, is provided in the region of inflow opening 18.4.

A completely encapsulated underwater propulsion unit is constituted thanks to the sealed, insertable connection of electronics housing 40 to motor housing 33, the sealed mounting of external tube 34.1 onto motor housing 30, and a propeller-side seal (not shown) between external tube 34.1 and motor shaft 40. That unit can be arranged in water-floodable regions within hull 11 of swimming and diving aid 10. In the present exemplifying embodiment, electric motor 30 and the motor controller arranged in electronics housing 40 are arranged in flooding chamber 19, whereas external tube 34.1 is arranged, along with motor shaft 34, in flow channel 18. Upon immersion of swimming and diving aid 10, flooding chamber 19 becomes flooded with water through flood openings 19.1 and water inlet and outlet openings 15.2, 15.3, and the displaced air escapes through vent openings 15.1, as shown in FIG. 2. As swimming and diving aid 10 moves through the water, a flow occurs within flooding chamber 19: water flows into water inlet openings 15.2 located at bow 11.1, and flows out again through water outlet openings 15.3 arranged at stern 11.5. Electric motor 30 and the motor controller are thus efficiently cooled by the water flowing past. Waste heat can be dissipated quickly, so that an electric motor 30 and an associated motor controller having a very high power level can be installed.

Electric motor 30 drives the propeller via motor shaft 34. The propeller generates a flow of water within flow channel 18 from inflow opening 18.4 to jet outlet 17, thereby propelling swimming and diving aid 10. A rotor 32 of electric motor 30 is placed onto, and adhesively bonded to, a rotor portion of motor shaft 34. A stator 31 of electric motor 30 is provided encirclingly around rotor 32. Stator 31 is encapsulated in motor housing 33 using an encapsulating compound, and thereby thermally coupled to motor housing 33. Waste heat from electric motor 30 can thereby be efficiently dissipated to motor housing 33, and from there to the water flowing past.

Figure 6:
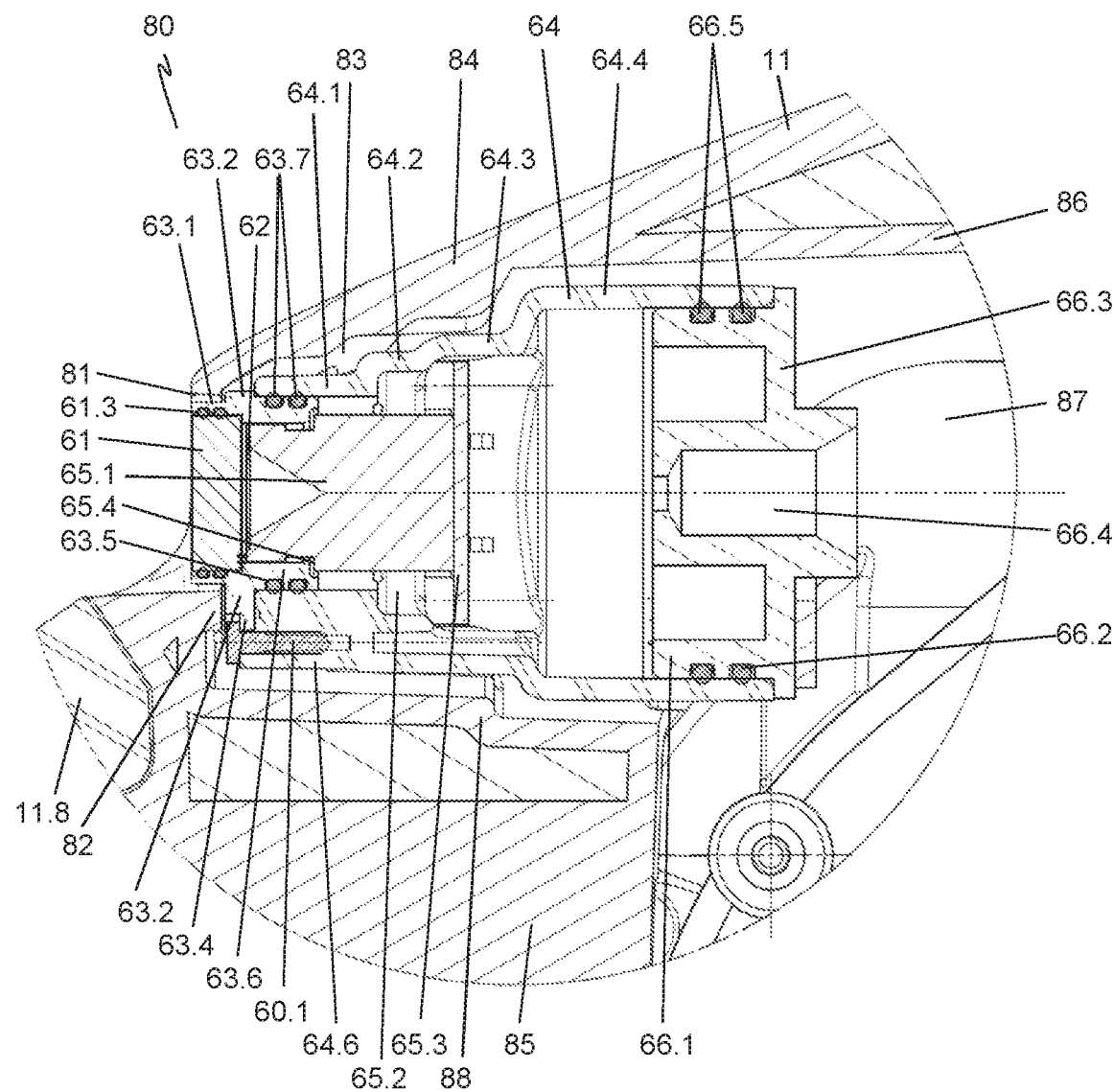
FIG. 6 is an enlarged section view of a portion, shown in FIG. 4, of the swimming and diving aid in the region of the front camera subassembly shown in FIG. 5.

Front camera subassembly 60 is arranged in a front camera receiving region 80 in the region of bow 11.1 of swimming and diving aid 10, as shown in enlarged fashion in FIG. 6 for the region labeled "VI."

Figure 7:
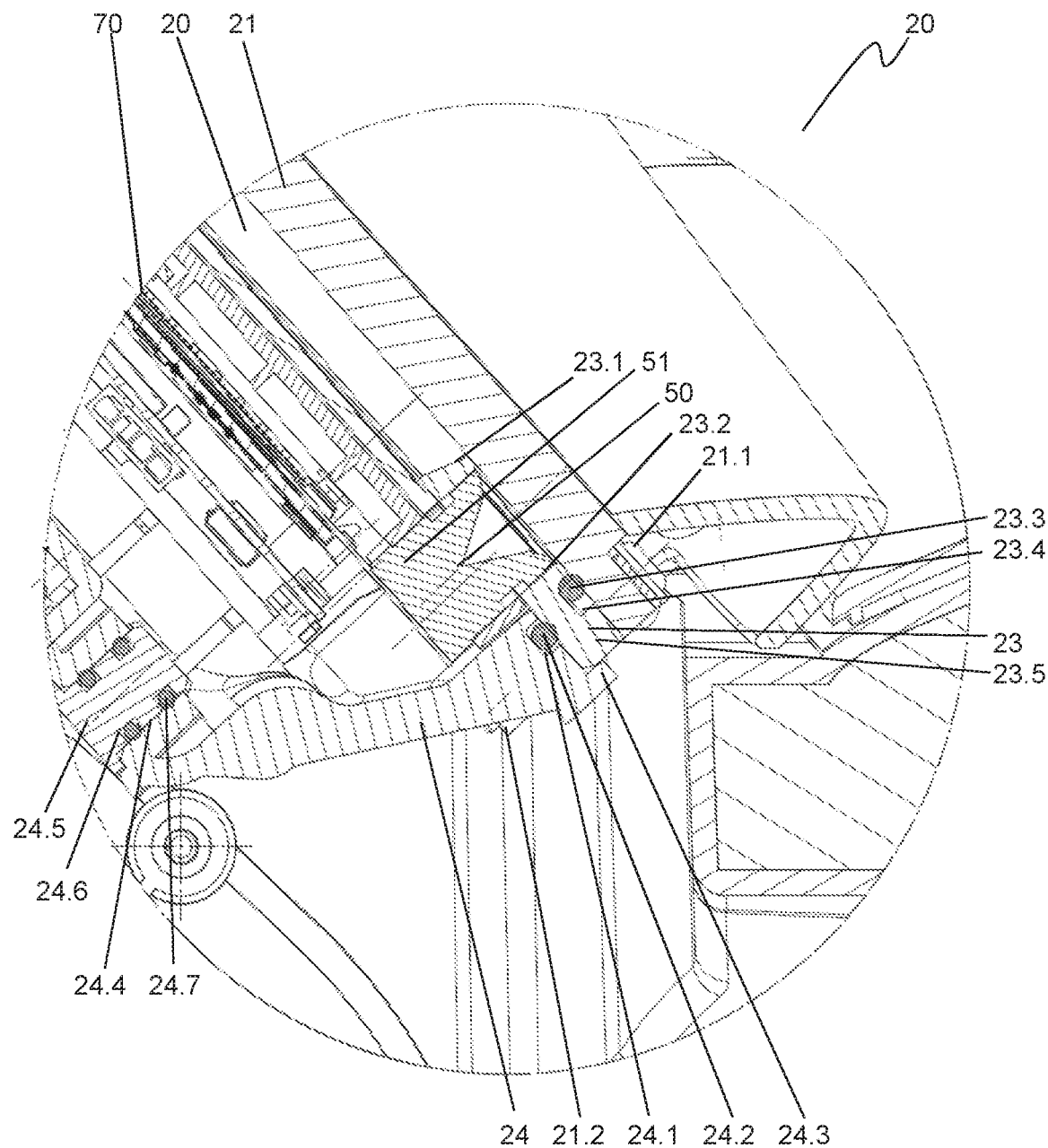
FIG. 7 is an enlarged section view of a portion shown in FIG. 4, in the region of a back camera.

A region around back camera 50, labeled "VII," is depicted in enlarged fashion in FIG. 7.

Figure 5:
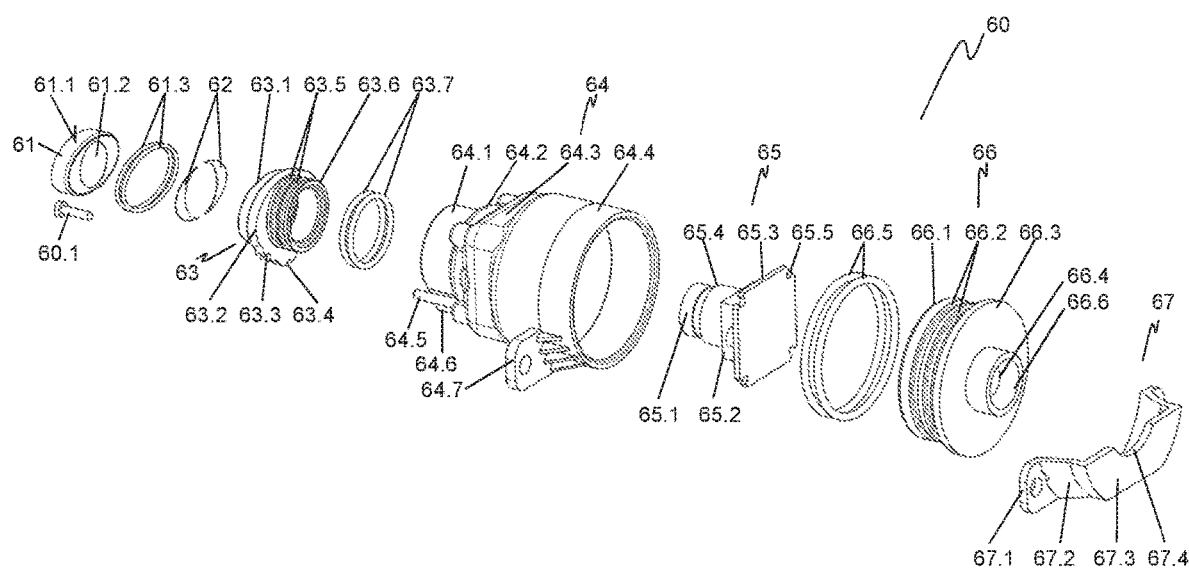
FIG. 5 is an exploded depiction of a front camera subassembly.

FIG. 5 is an exploded view of front camera subassembly 60.

Transparent window 61 has an oval outer enveloping surface 61.1, associated with which are two window sealing elements 61.3. Two sickle-shaped blocking elements are also associated with the oval transparent window 61.2. Those elements are shaped in such a way that they follow the external contour of transparent window 61.2 with their outer contours, and leave open a circular transparent region 61.2 in the center of transparent window 61.2.

A window housing 63 is arranged to face toward transparent window 61. Window housing 63 comprises a window bezel 63.1, a subsequent locking portion 63.2, and a terminating cylindrical extension piece 63.6. Window bezel 63.1 surrounds an oval aperture into which transparent window 61, sealed by window sealing elements 61.3, can be inserted. Alternatively or additionally, it is conceivable for transparent window 61 to be adhesively bonded, along its enveloping surface 61.1, into the oval aperture of window bezel 63.1. Window bezel 63.1 is embodied in such a way that blocking elements 62 are held in position abuttingly against transparent window 61 when front camera subassembly 60 is installed.

A camera enclosure 64 is also associated with front camera subassembly 60. Camera enclosure 64 comprises a cylindrical first housing portion 64.1 that faces toward extension piece 63.6 of window housing 63. Adjoining first housing portion 64.1 is a second housing portion 64.2 that is widened in terms of its outside diameter as compared with first housing portion 64.1. Second housing portion 64.2 is followed by a third housing portion 64.3 having an external and internal contour that is substantially rectangular in the present case. Shaped onto third housing portion 64.3 is a cylindrical fourth housing portion 64.4 that has an outside diameter once again enlarged with respect to second housing portion 64.2. Two locking studs 64.5 that face toward window housing 63 are arranged with an angular offset on the sides of first housing portion 64.1. Only one of locking studs 64.5 is visible in the selected view, while the other locking stud 64.5 is arranged so as to be concealed by first housing portion 64.1. A bolt extension 64.6 is furthermore arranged laterally on first housing portion 64.1, facing toward window housing 63. In the present case, bolt extension 64.6 is arranged at half the angle that is formed between the two locking studs 64.5 and refers to the center axis of camera enclosure 64. Bolt extension 64.6 and locking studs 64.5 are shaped at the ends onto second housing portion 64.2 and laterally onto first housing portion 64.1. Bolt extension 64.6 and locking studs 64.5 protrude toward window housing 63 beyond the end-face termination of first housing portion 64.1 of camera enclosure 64.

First housing portion 64.1 comprises, along its longitudinal center axis, a cylindrical aperture into which extension piece 63.6 of window housing 63 can be slid. In order to make possible a watertight connection between camera enclosure 64 and window housing 63, two O-ring grooves 63.5 are recessed encirclingly into extension piece 63.6 of window housing 63. A respective window-housing sealing element 63.7 can be inserted into each of these O-ring grooves 63.5. In the installed condition, window-housing sealing elements 63.7 are located between O-ring grooves 63.5 of extension piece 63.6 and the inner surface of first housing portion 64.1, and thereby seal the transition gap.

Locking portion 63.2 is embodied eccentrically with respect to extension piece 63.6, projecting radially encirclingly beyond extension piece 63.6. Locking portion 63.2 thus constitutes a stop with respect to first housing portion 64.1 of camera enclosure 64. It thus limits how far window housing 63 can be slid into first housing portion 64.1. Locking portion 63.2 comprises latching steps 63.3 facing toward locking studs 64.5. Upon insertion of extension piece 63.6 into first housing portion 64.1 of camera enclosure 64, locking studs 64.5 engage into latching steps 63.3 of locking portion 63.2. As a result, window housing 63 is also exactly aligned in a circumferential direction with respect to camera enclosure 64. Bolt extension 64.6 of camera enclosure 64 is aligned on a bolt passthrough 63.4 on the outer rim of locking portion 63.2. When front camera subassembly 60 is installed, an immobilizing bolt 60.1 can be guided through bolt passthrough 63.4 and threaded into bolt extension 64.6 until its bolt head abuts against locking portion 63.2. Window housing 63 is thereby held axially with respect to camera enclosure 64.

Two camera-housing flanges 64.7 are shaped, oppositely and laterally protrudingly, onto fourth housing portion 64.4 of camera enclosure 64. Camera-housing flanges 64.7 each have an orifice, which orifices serve to fasten front camera subassembly 60 onto hull 11 of swimming and diving aid 10, in which context bolts are correspondingly to be guided through the orifices and thread-joined to hull 11.

A front camera 65 is arranged oppositely from fourth housing portion 64.4 of camera enclosure 64. A camera circuit board 65.3 is associated with front camera 65, having its camera lens 65.1 and its camera housing 65.2. The diameter of camera lens 65.1 increases toward camera housing 65.2 in the form of a step 65.4. Bolt passthroughs 65.5, for fastening front camera 65 in camera enclosure 64, are provided in the corners of camera circuit board 65.3.

A housing closure 66 is arranged with a spacing from front camera 65. Housing closure 66 comprises a sealing portion 66.1 in the form of a hollow cylinder, into which two encircling, groove-shaped O-ring receptacles 66.2 are shaped. On its side facing away from camera enclosure 64, housing closure 66 is closed by a circular closure cover 66.3. Closure cover 66.3 has a larger diameter than sealing portion 66.1. A cable aperture 66.4 is shaped into closure cover 66.3 along its center axis. Cable aperture 66.4 is encirclingly surrounded by an annular flange 66.6.

Two housing O-rings 66.5 are depicted between housing closure 66 and front camera 65. Housing O-rings 66.5 can be placed into O-ring receptacles 66.2 of housing closure 66. Once front camera 65 has been installed in camera enclosure 64, housing closure 66 can be slid with its sealing portion 66.1 into fourth housing portion 64.4 of camera enclosure 64 until it abuts with its closure cover 66.3 against camera enclosure 64. Connector cables of front camera 65 can be guided out of camera enclosure 64 through cable aperture 66.4.

Lastly, a holding clamp 67 of front camera subassembly 60 is shown. Holding clamp 67 comprises laterally oppositely arranged clamp flanges 67.1 that are connected, by means of projecting clamp struts 67.2, to a holding region 67.3. A housing closure support 67.4 is shaped into holding region 67.3. When housing closure 66 is slid into camera enclosure 64, holding clamp 67 can be pressed with its holding region 67.3 against closure cover 66.3 of housing closure 66 in such a way that clamp flanges 67.1 abut against camera-housing flanges 64.7 of camera enclosure 64. As has already been described with reference to the installation of camera enclosure 64, a respective fastening bolt can be guided through the mutually aligned orifices that are introduced into clamp flanges 67.1 and into camera-housing flanges 64.7, and thread-joined to hull 11 of swimming and diving aid 10. Front camera subassembly 60 is thereby fixedly connected to hull 11, housing closure 66 being held axially by holding region 67.3 of holding clamp 67. Holding clamp 67 thus prevents housing closure 66 from being opened inadvertently. In the installed state, annular flange 66.6 is guided by housing closure support 67.4 of holding clamp 67.

FIG. 6 is an enlarged section view of a portion, shown in FIG. 4, of swimming and diving aid 10, in the region of front camera subassembly 60 shown in FIG. 5. The region depicted is marked in FIG. 4 as a portion labeled "VI."

Front camera subassembly 60, shown in FIG. 5 in an exploded view, is depicted in FIG. 6 in the installed state. Oval transparent window 61 is inserted into window bezel 63.1 of window housing 63. Transparent window 61 is sealed with respect to window housing 6 by means of window sealing elements 61.3 3. As already mentioned, transparent window 61 can also, in addition or alternatively to window sealing elements 61.3, be adhesively bonded to window housing 64. First housing portion 64.1 of camera enclosure 64 is slid onto extension piece 63.6 of window housing 63 in such a way that said portion abuts with its end face against locking portion 63.2 of window housing 63. The transition from extension piece 63.6 to first housing portion 64.1 is sealed by means of window-housing sealing elements 63.7 that are placed into O-ring grooves 63.5 of extension piece 63.6. Immobilizing bolt 60.1 is guided through bolt passthrough 63.4 of locking portion 63.2 of window housing 63 to bolt extension 64.6 of camera enclosure 64, and threaded into it. As a result, the bolt head of immobilizing bolt 60.1 abuts with one portion against locking portion 63.2, so that window housing 63 is held axially with respect to camera enclosure 64. In a circumferential direction, window housing 63 is exactly aligned with respect to camera enclosure 64 by the engagement of locking studs 64.5 (shown in FIG. 5) into latching steps 63.3 of locking portion 63.2. The result is an exact alignment, both axially and in a circumferential direction, of front camera 65, installed in camera enclosure, with respect to window housing 63 and thus with respect to the oval-shaped transparent window 61.

Front camera 65 is introduced into camera enclosure 64 sufficiently far that the front termination of its camera lens 65.1 is flush with the outer end of first housing portion 64.1. Camera lens 65.1 thus ends immediately in front of blocking elements 62. Camera lens 65.1 abuts with its step 65.4 against a correspondingly embodied inner step that is mounted encirclingly on the outer end-face termination of extension piece 63.6 of window housing 63. Front camera 65 is thereby exactly positioned in an axial direction. Camera housing 65.2 is arranged in second housing portion 64.2 that is widened in stepped fashion as compared with first housing portion 64.1, while the rectangular camera circuit board 65.3 is introduced into the correspondingly rectangularly embodied third housing portion 64.3. Camera enclosure 64 is closed off at the end by housing closure 66. The latter is slid with its sealing portion 66.1 until it comes to a stop against closure cover 66.3 in fourth housing portion 64.4 of camera enclosure 64. A data cable, in the present case a USB cable (not depicted), is guided through cable aperture 66.4 of closure cover 66.3. Front camera 65 can thereby be connected to an electronic control system 70 shown in FIG. 7.

Front camera subassembly 60 is secured in a front camera receptacle 83 of hull 11. Front camera receptacle 83 is shaped for that purpose into hull 11 in the inner region.

Facing toward bow tip 11.8, front camera receptacle 83 is open through a camera passthrough 81 in the outer skin of hull 11. Camera passthrough 81 has an oval shape, and oval window bezel 63.1 of window housing 63 is slid into camera passthrough 81. Encirclingly with respect to camera passthrough 81, hull 11 forms a camera stop 82 against which window housing 63 abuts with its locking portion 63.2. Immobilizing bolt 60.1 also abuts with its bolt head against camera stop 82. This prevents inadvertent loosening of immobilizing bolt 60.1. The axial position of front camera subassembly 60 is exactly defined by the fact that locking portion 63.2 comes to a stop against camera stop 82 encirclingly around camera passthrough 81. Because of the oval conformation of transparent window 61 and of window bezel 63.1 of window housing 63, the latter are unequivocally aligned in a circumferential direction with respect to the (likewise oval-shaped) camera passthrough 81 of hull 11. As a result of the above-described operative connection between locking studs 64.5 of camera enclosure 64 and latching steps 63.3 of window housing 63, camera enclosure 64 (and thus front camera 65 installed therein) are exactly aligned in a circumferential direction with respect to window housing 63 and thus with respect to hull 11 of swimming and diving aid 10.

A seal between window housing 63 and hull 11 is not needed in the region of camera passthrough 81 thanks to the watertight embodiment of front camera subassembly 60. As is more clearly evident from FIG. 4, the interior of the front camera receiving region, and thus front camera receptacle 83, are physically connected to flooding chamber 19. Water flowing laterally past window housing 63 thus travels into flooding chamber 19 through which water flows in any case during operation. It is also conceivable, however, to seal, by means of an adhesive, a sealant, or a sealing element, the gap formed between window housing 63 and hull 11 in the region of camera passthrough 81. Front camera access region 87 to front camera subassembly 60 is constituted by way of flooding chamber 19, thereby enabling access to front camera 65, for example for maintenance or repair.

As already described with reference to FIG. 5 (but not visible in the section view selected for FIG. 6), front camera subassembly 60 is connected to hull 11 by means of bolts that are guided through the orifices of camera housing flanges 64.7 and clamp flanges 67.1.

Facing toward front camera subassembly 60, hull 11 has an inwardly stepped hull portion 84. That portion conforms, in terms of its contour, to the external shape of front camera subassembly 60 and/or to the stepped sequence of housing portions 64.1, 64.2, 64.3, 64.4 of camera enclosure 64. Hull 11 is further embodied in stiffened fashion in front camera receiving region 80. In the present case, for example, a vertically arranged stiffening web 85 and a horizontally arranged stiffening strut 86 are guided into front camera receiving region 80. The stiffening web carries a bezel 88 that at least partly circumferentially encloses front camera subassembly 60. These stiffening features prevent the hull from deforming or vibrating in front camera receiving region 80 even with a severe mechanical load on hull 11, for example at high speed in swimming mode. Blurring of the video images of front camera 65, which might be caused by high-frequency vibrations of an insufficiently reinforced hull 11, is thereby avoided.

FIG. 7 is an enlarged section view of a portion in the region of back camera 50, shown in FIG. 4 and labeled "VII" therein. Back camera 50 is arranged in a display 20 that is oriented in a direction toward support surface 11.3 of swimming and diving aid 10, and thus toward a supported operator.

Display 20 is covered by a transparent display covering 21. At the outer periphery of display covering 21, display housing 23 abuts with a display housing frame 23.5 against display covering 21. In order to prevent the entry of water, a groove 23.4, into which a first sealing element 23.3 is placed, is shaped into the abutment surface of display housing frame 23.5 against display covering 21. Back camera receptacle 23.2 is shaped into display housing frame 23.5. Back camera 50 is inserted with its back camera housing 51 into back camera receptacle 23.2. LCD display element 22 is inserted, with a lateral spacing from back camera 50, into LCD display element receptacle 23.1 of display housing 23 and held therein. A human-machine interface (HMI) housing 24 is flange-mounted onto display housing 23. HMI housing 24 abuts with its rim against display housing frame 23.5 of display housing 23. For exact positioning, an HMI housing web 24.3 is encirclingly shaped onto the rim of HMI housing 24, which externally surrounds display housing frame 23.5. An HMI housing groove 24.1 is shaped into the abutment surface of HMI housing 24 against display housing 23. Inserted into said groove is a second sealing element 24.2 by means of which HMI housing 24 is sealed with respect to display housing 23. Bolts 21.1 are guided through display covering 21, display housing frame 23.5, and the rim of HMI housing 24, and threaded at the rear into a respective nut 21.2. Display covering 21, display housing 23, and HMI housing 24 are thereby connected to one another.

Electronic control system 70 is inserted into HMI housing 24 and immobilized. HMI housing 24 has at the rear a cable passthrough 24.4 in the form of an aperture. A plug 24.5 is inserted into cable passthrough 24.4. Plug 24.5 has two axially spaced plug grooves 24.6. O-rings 24.7, with which plug 24.5 is sealed with respect to HMI housing 24, are placed into plug grooves 24.6. Plug 24.5 has a central orifice for sealed passage of a cable. The data cable of front camera 65 can be introduced through said orifice into HMI housing 24.

Front camera 65 and back camera 50 are respectively connected to electronic control system 70 via data cables. In the present case, the front camera is connected via a USB 2.0 interface, and back camera 50 via a MIPI interface, to electronic control system 70. Electronic control system 70 is connected via a bus system to the motor controller arranged in electronics housing 40. LCD display element 22 is furthermore connected to electronic control system 70. Control elements 16.1, switching element 16.2, and switchover element 16.3, which are arranged on grips 16, are connected to the motor controller. Control elements 16.1 serve to control the water acceleration device of swimming and diving aid 10 and in that context, in particular, to control the power level of electric motor 30. At least some of the functionality of cameras 50, 65 can be controlled by way of switching element 16.2 and switchover element 16.3. For that purpose, electronic control system 70 retrieves the respective switching state of switching element 16.2 and of switchover element 16.3 from the motor controller in short cycles. The video image of front camera 65 or of back camera 50, depending on the actuation of switching element 16.2 and of switchover element 16.3, can thereby be shown on display 20. Video captures can furthermore be recorded by a memory connected to electronic control system 70. In the present case, an SD memory card is provided as a memory. Electronic control system 70 furthermore comprises a WiFi interface by way of which video data can be transferred to an external data medium, for example a smartphone or a computer. The WiFi interface is furthermore designed to receive software updates for all the hardware components of the swimming and diving aid, for example for the camera control system and/or for the display control system and/or for the motor controller and/or for the rechargeable battery management system (battery controller). Software updates to the motor controller are then forwarded from the electronic control system 70 to the motor controller via the data bus, in the present case a CAN data bus. It is also conceivable to transmit diagnostic data of the swimming and diving aid 10 to external devices via the WiFi interface. Such diagnostic data can relate, for example, to the state of the rechargeable batteries or to faults in the propulsion system. It is also conceivable to provide a WLAN interface or a Bluetooth interface instead of the WiFi interface. The digital connection between the motor controller and electronic control system 70 makes it possible to show current operating parameters of swimming and diving aid 10 on display 20.

Figure 8:
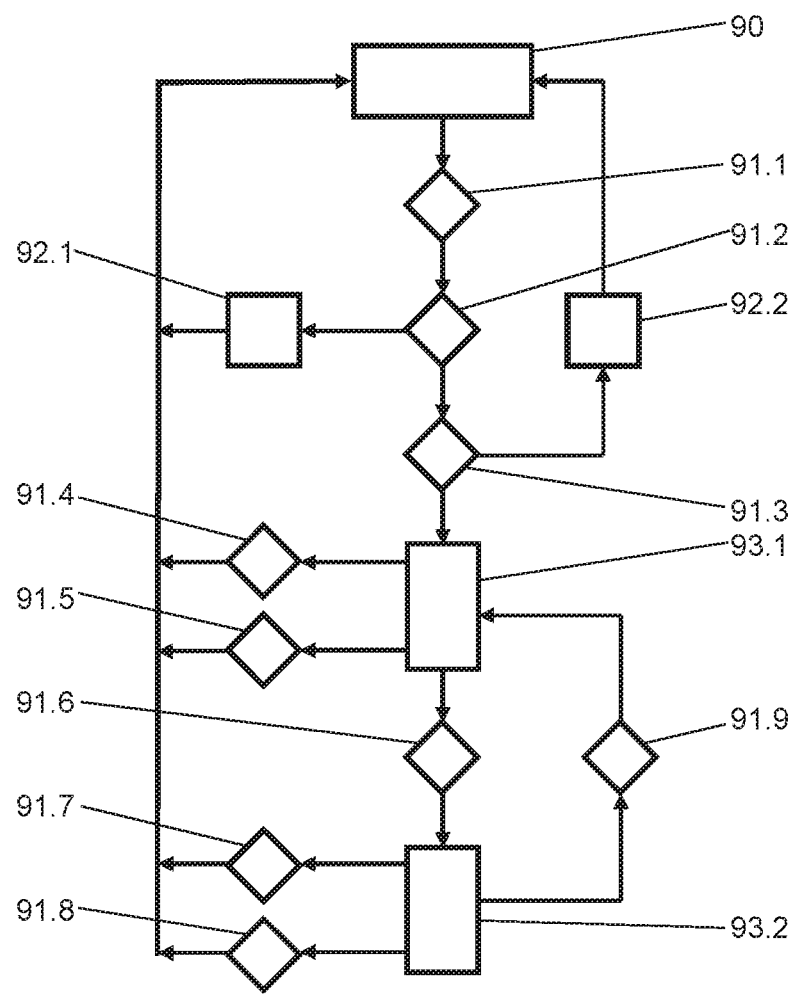
FIG. 8 is a flow chart for controlling the camera.

FIG. 8 is a flow chart for controlling cameras 50, 65. Starting from a main menu 90, an "SE" query 91.1 queries whether switching element 16.2 has been actuated. If so, in the next "power setting" query 91.2 the current power setting of the motor controller for electric motor 30 is queried. If a power setting of 0 is set, i.e. if no voltage is being applied to electric motor 30, then in a first "message output" 92.1, display 20 is notified to establish a power setting of at least 1. This query prevents a video capture from being inadvertently started while swimming and diving aid 10 is not being operated. Swimming and diving aid 10 preferably has a system for decoupling energy transfer to the propeller, so that video captures can be effected even when swimming and diving aid 10 is stationary. After the first "message output" 92.1, execution branches back to main menu 90. If the response to the "power setting" query 91.2 is that a voltage is being applied to electric motor 30, then in a first "memory capacity" query 91.3 the free memory capacity of the memory for video captures is checked. If the memory capacity is below a predefined limit value, then in a second "message output" 92.2 a notification is issued that insufficient memory capacity is available for a video capture, and files must first be deleted. Execution then branches back to main menu 90. If, however, the available memory capacity in the first "memory capacity" query 91.3 corresponds to or is above the limit value, then in a "front capture" block 93.1 a video capture is made via front camera 65. The video data captured by front camera 65 are then shown on display 20 and recorded by the digital memory. During video recording, the switching state of switching element 16.2 is queried in a second "SE" query 91.4, and the available memory capacity is queried in a second "memory capacity" query 91.5. If switching element 16.2 is actuated during video capture, that capture is then terminated and execution branches to main menu 90. If the memory capacity of the memory reaches a second limit value during video capture using front camera 65, the video capture is then terminated and user interaction is directed to main menu 90. During video capture using front camera 65, the switching state of switchover element 16.3 is furthermore queried via first "US" query 91.6. If that element is pressed, the current video capture by front camera 65 is terminated, and a video capture using the rear-facing back camera 50 is performed in a "rear capture" block 93.2. That video capture is also stored, and shown on display 20. Analogously to capture using front camera 65, during capture using back camera 50 the switching state of switching element 16.2 is queried in a third "SE" query 91.7, the free memory capacity of the data memory is queried in a third "memory capacity" query 91.8, and the switching state of switchover element 16.3 is queried in a second "US" query 91.9. Upon actuation of switching element 16.2, or if the memory capacity falls below the second limit value, video capture is terminated and user interaction is directed to main menu 90. Actuation of switchover element 16.3 causes video capture using back camera 90 also to be terminated, and starts a new video capture via front camera 65.

The limit value for the memory capacity in the context of the first "memory capacity" query 91.3, for example 2 GB, is preferably selected to be greater than the second limit value in the context of the second "memory capacity" query 91.5, for example 1 GB.

Provision of the two cameras 50, 65 makes it possible to acquire video captures both in a travel direction and of the operator. Switching element 16.2 mounted on a grip 16.1, and switchover element 16.3 likewise mounted on a grip 16.1, allow simple operation of the video system even during vigorous riding. Data can be exchanged with external devices using the WiFi interface that is provided. The digital connection between electronic control system 70 and the motor controller also allows data to be sent and received via the WiFi interface to and from the motor controller or other hardware components of the swimming and diving aid, for example the camera control system and/or the display control system and/or the rechargeable battery management system (battery controller). The video system thus makes possible an additional functionality, for example by the fact that software updates can be transferred to the motor controller and/or to the other aforementioned hardware components. Because front camera 65 is integrated into hull 11, it is possible to acquire images oriented in a direction of travel. The integration of front camera 65 into hull 11 results in low vibration and thus interference-free video captures. Video quality is appreciably improved in particular by additional stiffening of front camera receiving region 80 of hull 11.

The invention claimed is:

1. A swimming and diving aid, comprising:
    a hull having associated therewith a flow channel and a motor-driven water acceleration arrangement;
    a support surface for an upper body on an upper side of the hull;
    one or more grips mounted on the swimming and diving aid;
    a display facing toward the support surface and configured to show operating parameters of the swimming and diving aid;
    a forward-directed front camera integrated into the hull in front of the support surface in a direction of travel, and connected to an electronic control system;
    wherein the electronic control system is configured to apply control to the front camera and to receive camera signals; and
    a switching element for starting and ending a video capture is arranged on at least one of the one or more grips.

2. The swimming and diving aid of claim 1, wherein a rearward-directed back camera is arranged in front of the support surface and is connected to the electronic control system.

3. The swimming and diving aid of claim 2, wherein a switchover element is arranged on at least one of the one or more grips and configured for switching over between respectively occurring video capture by the front camera and the back camera.

4. The swimming and diving aid of claim 3, wherein the display is connected to the electronic control system and is configured to show an image being acquired using a respectively selected camera from among the front camera and the back camera.

5. The swimming and diving aid of claim 3, wherein an LCD display element of the display, the back camera, and the electronic control system are arranged in a one- or two-part housing embodied to be watertight.

6. The swimming and diving aid of claim 5, wherein the housing that is embodied to be watertight is covered by a transparent display covering at least in a region of the LCD display element, or in a region of the LCD display element and of the back camera.

7. The swimming and diving aid of claim 3, wherein:
the electronic control system is connected to a motor controller via a data bus;
switching signals from the switching element and/or of the switchover element are delivered to the motor controller; and
the electronic control system is configured to retrieve the switching signals of the switching element and/or of the switchover element from the motor controller.

8. The swimming and diving aid of claim 1, wherein the electronic control system is configured to enable a video capture if a voltage is applied to an electric motor of the water acceleration arrangement, and not to enable a video capture if no voltage is applied to the electric motor of the water acceleration arrangement.

9. The swimming and diving aid of claim 1, wherein the electronic control system is configured:
to enable a video capture when a free memory capacity of a memory for the video captures corresponds to or exceeds a predefined first limit value,
not to enable a video capture if the free memory capacity of the memory for the video captures falls below the predefined first limit value, and
to interrupt a video capture if the free memory capacity of the memory for the video captures falls below a predefined second limit value.

10. The swimming and diving aid of claim 1, wherein the electronic control system comprises a radio interface, and the electronic control system is configured to transfer video data and/or to receive software updates for one or more hardware components of the swimming and diving aid via the radio interface.

11. The swimming and diving aid of claim 1, wherein a microphone is associated with the front camera and/or a rearward-directed back camera arranged in front of the support surface and connected to the electronic control system, and wherein audio signals captured via the microphone are delivered to the electronic control system.

12. The swimming and diving aid of claim 1, wherein the front camera is connected to the electronic control system via a USB interface and a data cable.

13. The swimming and diving aid of claim 1, further comprising a rearward-directed back camera arranged in front of the support surface and connected to the electronic control system via a MIPI interface.

14. The swimming and diving aid of claim 1, wherein:
the front camera is arranged in a watertight camera enclosure;
the watertight camera enclosure is received in a front camera receptacle inside the hull and fastened to the hull;
the outer envelope of the hull comprises, in the viewing direction of the front camera, a camera passthrough in which a transparent window is arranged; and
the transparent window closes off the watertight camera enclosure at the front.

15. The swimming and diving aid of claim 14, wherein the front camera receptacle is in physical communication with a flooding chamber of the swimming and diving aid.

16. The swimming and diving aid of claim 14, wherein the transparent window, or a window housing in which the transparent window is held, is sealed with respect to the camera passthrough.

17. The swimming and diving aid of claim 14, wherein a water-conveying gap is configured between the transparent window, or a window housing in which the transparent window is held, and the camera passthrough.

18. The swimming and diving aid of claim 14, wherein one or more of the transparent window and a window bezel of a window housing in which the transparent window is held, is of oval configuration.

19. The swimming and diving aid of claim 14, wherein:
the window housing is connected sealedly to the camera enclosure; and
the window housing and the camera enclosure are configured to define and maintain, in both an axial and a circumferential direction, an unequivocal orientation of the window housing with respect to the camera enclosure.

20. The swimming and diving aid of claim 14, wherein:
the camera enclosure is closed off at the rear by a housing closure that can be placed in watertight fashion onto the camera enclosure; and
a data cable for transferring video data to the electronic control system is guided in watertight fashion through the housing closure.

\* \* \* \* \*